(12) United States Patent
Rajendran

(10) Patent No.: US 8,566,479 B2
(45) Date of Patent: Oct. 22, 2013

(54) METHOD AND SYSTEM TO ALLOW LOGICAL PARTITIONS TO ACCESS RESOURCES

(75) Inventor: Antonisamy Arokkia Rajendran, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1644 days.

(21) Appl. No.: 11/255,393

(22) Filed: Oct. 20, 2005

(65) Prior Publication Data

US 2007/0094419 A1    Apr. 26, 2007

(51) Int. Cl.
*G06F 3/00* (2006.01)
*G06F 12/00* (2006.01)

(52) U.S. Cl.
USPC ............... 710/3; 711/101; 711/173; 711/207

(58) Field of Classification Search
USPC ................. 710/3, 101; 711/101, 173, 207
See application file for complete search history.

(56) References Cited

U.S. PATENT DOCUMENTS

| | | | |
|---|---|---|---|
| 5,253,344 A | 10/1993 | Bostick et al. | |
| 5,659,756 A | 8/1997 | Hefferon et al. | |
| 5,860,146 A * | 1/1999 | Vishin et al. | 711/207 |
| 6,438,671 B1 * | 8/2002 | Doing et al. | 711/173 |
| 6,877,158 B1 | 4/2005 | Arndt | |
| 6,941,436 B2 * | 9/2005 | Lee et al. | 711/173 |
| 2002/0129172 A1 | 9/2002 | Baskey et al. | |
| 2002/0152335 A1 | 10/2002 | Holm et al. | |
| 2003/0204648 A1 | 10/2003 | Arndt | |
| 2003/0208642 A1 | 11/2003 | Desao et al. | |
| 2003/0217200 A1 * | 11/2003 | Yoshioka | 710/3 |
| 2004/0139295 A1 * | 7/2004 | Arimilli et al. | 711/207 |
| 2005/0114555 A1 * | 5/2005 | Errickson et al. | 710/3 |
| 2005/0273546 A1 * | 12/2005 | Tsujimura | 711/101 |
| 2006/0064567 A1 * | 3/2006 | Jacobson et al. | 711/207 |

* cited by examiner

*Primary Examiner* — Henry Tsai
*Assistant Examiner* — Jing-Yih Shyu
(74) *Attorney, Agent, or Firm* — Scully, Scott, Murphy & Presser, P.C.; Ronald A. Kaschak

(57) ABSTRACT

Disclosed are a method of and a system for enabling a program running on a logical partition, of a logically partitioned data processing system, to access directly resources of the data processing system. The method comprising the steps of, said program transforming a first address for a resource of a specific type on the data processing system, to a second address, within an address space allocated to said logical partition; and said program using said second address space to access a resource of said specific type allocated to said logical partition. In this way, the present invention may be used to enable a program running within a partition's address space to access IO devices directly, thus avoiding the overhead of making a hypervisor call.

17 Claims, 3 Drawing Sheets

METHOD AND SYSTEM TO ALLOW LOGICAL PARTITIONS TO ACCESS RESOURCES

BACKGROUND OF THE INVENTION

1. Field of the Invention

This invention generally relates to managing resources among multiple operating systems within a logically partitioned data processing system. More specifically, the invention relates to methods and systems for managing access to resources, such as IO resources, within such a data processing system.

2. Background Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other, such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

In order to control and/or manage the multitude of operating systems in the various partitioned environments, a single global software system and/or firmware component, which may be termed a hypervisor, is generally utilized. The hypervisor is generally configured to manage and/or control the allocation/use of the resources available on the single computer hardware system by each of the respective operating systems. For example, the hypervisor may control resource access and allocation for the overall computer system data storage mediums, access to the available system CPUs, and/or any of the system input/output (IO) device adapters, along with other known features of computer systems. The hypervisor may be further configured to insure that the respective individual partitions are unaware of the existence of each other and do not interfere with their respective operations.

Resources are assigned to specific partitions by allocating a range of addresses to a partition, and then assigning resources that are to be allocated to that partition, an address within the allocated range of the partition. For example, in a logically partitioned system, IO (Input/Output) resources are allocated to logical partitions, among other resources. Many of these IO resources are not sharable among partitions, rather dedicated to one of the partitions. The IO address space falls outside the range of a partition's allowed address space. So a program, for example, a device driver, running in a partition has to make a hypervisor call in order to access the IO devices. While the hypervisor effectively manages access to the IO resources, there is a certain amount of overhead associated with making a hypervisor call.

SUMMARY OF THE INVENTION

An object of this invention is to provide an improved procedure for managing access to resources within logically partitioned data processing systems.

Another object of the present invention is to enable a program running within the address space of a logical partition, of a logically partitioned data processing system, to access IO devices directly, thus avoiding the overhead of making a hypervisor call.

A further object of the invention is to map the memory mapped IO addresses that fall outside a partition's address space, to within the partition's address space, thus enabling the programs running in the logical partition to access directly the memory mapped IO resources allocated to it.

These and other objectives are attained with a method of and a system for enabling a program running on a logical partition, of a logically partitioned data processing system, to access directly resources of the data processing system. The method comprises the steps of, said program transforming a first address for a resource of a specific type on the data processing system, to a second address, within an address space allocated to said logical partition; and said program using said second address to access a resource of said specific type allocated to said logical partition. In this way, the present invention may be used, for example, to enable a program running within a partition's address space to access IO devices directly, thus avoiding the overhead of making a hypervisor call.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
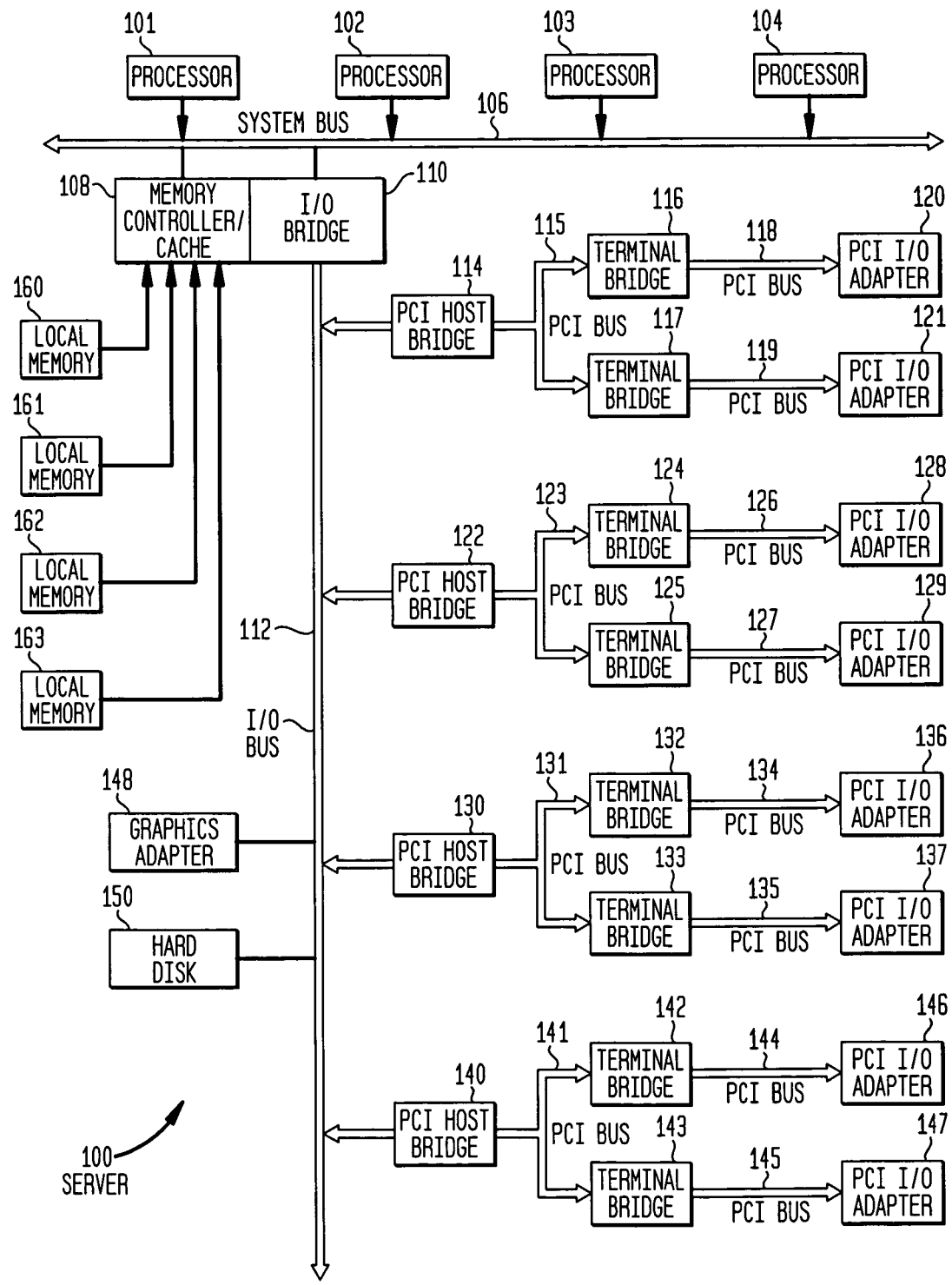
FIG. 1 depicts a block diagram of a data processing system that may be used to implement the present invention.

With reference now to the figures, and in particular with reference to FIG. 1, a block diagram of a data processing system, which may be implemented as a logically partitioned data processing system, is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120-121, 128-129, 136-137, and 146-147 may be assigned to different logical partitions.

Thus, for example, data processing system 100 may be divided into three logical partitions, P1, P2, and P3. Each of I/O adapters 120-121, 128-129, and 136-137, each of processors 101-104, and each of local memories 160-164 is assigned to one of the three partitions. For example, processor 101, memory 160, and I/O adapters 120, 128, and 129 may be assigned to logical partition P1; processors 102-103, memory 161, and I/O adapters 121 and 137 may be assigned to partition P2; and processor 104, memories 162-163, and I/O adapters 136 and 146-147 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Terminal Bridges 116-117 may be connected to PCI bus 115. Typical PCI bus implementations will support four Terminal Bridges for providing expansion slots or add-in connectors. Each of Terminal Bridges 116-117 is connected to a PCI I/O Adapter 120-121 through a PCI Bus 118-119. Each I/O Adapter 120-121 provides an interface between data processing system 100 and input/output devices such as, for example, other network computers, which are clients to server 100. Only a single I/O adapter 120-121 may be connected to each terminal bridge 116-117. Each of terminal bridges 116-117 is configured to prevent the propagation of errors up into the PCI Host Bridge 114 and into higher levels of data processing system 100. By doing so, an error received by any of terminal bridges 116-117 is isolated from the shared buses 115 and 112 of the other I/O adapters 121, 128-129, and 136-137 that may be in different partitions. Therefore, an error occurring within an I/O device in one partition is not "seen" by the operating system of another partition. Thus, the integrity of the operating system in one partition is not affected by an error occurring in another logical partition. Without such isolation of errors, an error occurring within an I/O device of one partition may cause the operating systems or application programs of another partition to cease to operate or to cease to operate correctly.

Additional PCI host bridges 122, 130, and 140 provide interfaces for additional PCI buses 123, 131, and 141. Each of the additional PCI buses 123, 131, and 141 are connected to a plurality of terminal bridges 124-125, 132-133, and 142-143 which are each connected to a PCI I/O adapter 128-129, 136-137, and 146-147 by a PCI bus 126-127, 134-135, and 144-145. Thus, additional I/O devices, such as, for example, modems or network adapters may be supported through each of the PCI I/O adapters 128-129, 136-137, and 146-147. In this manner, server 100 allows connections to multiple network computers. A memory mapped graphics adapter 148 and hard disk 150 may also be connected to I/O bus 112 as depicted, either directly or indirectly. Hard disk 150 may be logically partitioned between various partitions without the need for additional hard disks. However, additional hard disks may be utilized if desired.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
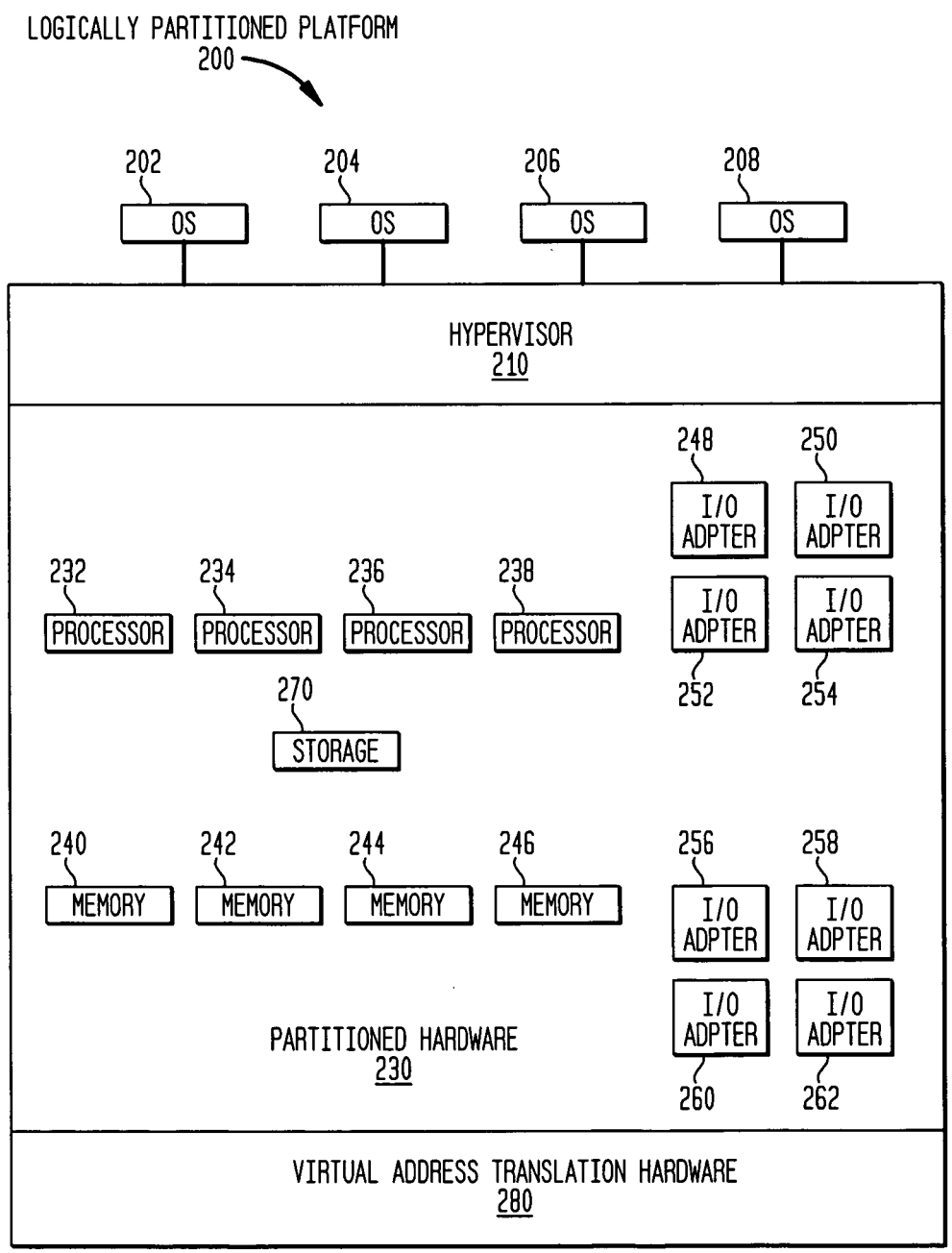
FIG. 2 shows a block diagram of a logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, virtual address translation hardware 280, hypervisor 210, and operating systems 202-208. Operating systems 202-208 may be multiple copies of a single operating system or multiple heterogeneous operating systems simultaneously run on platform 200.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, and I/O adapters 248-262 may be assigned to one of the multiple partitions within logically partitioned platform 200, each of which corresponds to one of operating systems 202-208.

Hypervisor 210, implemented as firmware, creates and enforces the partitioning of logically partitioned platform 200. Firmware is software stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Virtual address translation hardware 280 provides a mechanism for translating one of the operating systems' 202-208 virtual memory address pages for a resource to a physical hardware address corresponding to that resource. Virtual memory is a method of simulating more memory than actually exists, allowing platform 200 to run larger software programs or more programs concurrently. Virtual memory breaks up the software program into small segments, called pages, and brings as many pages into memory 240-246 that fit into a reserved area for that software program. When additional pages are required, the virtual memory makes room for them by swapping pages currently in memory but no longer needed to disk storage 270 or some other input/output device through one I/O adapters 248-260, thus freeing up memory for the additional pages. The virtual address translation hardware 280 keeps track of pages that have been modified, so that the modified pages can be retrieved when needed again.

In the prior art, when a program running within one of the logical partitions wants to access an IO device, that program has to make a hypervisor call. The hypervisor checks that the IO that has been requested has been allocated to that one of the logical partitions. If the IO has been allocated to that logical partition, the hypervisor then maps the requesting program to the IO resource.

The present invention enables a program running within a partition's address space to access IO devices directly, thus avoiding the overhead of making a hypervisor call.

Figure 3:
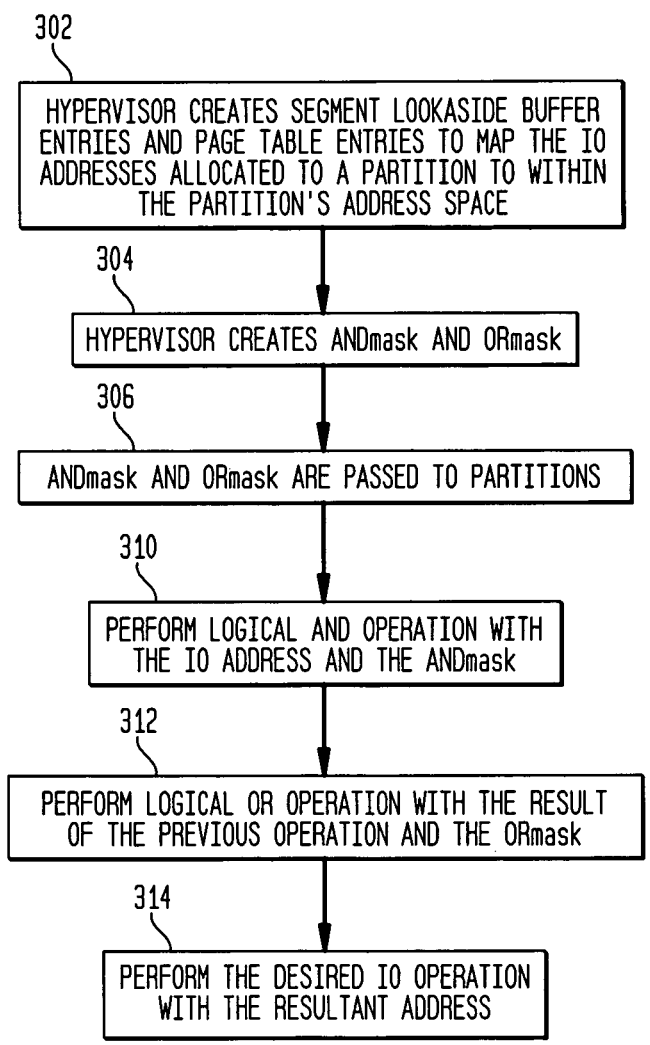
FIG. 3 is a flowchart illustrating an exemplary process for practicing the present invention.

More specifically, with reference to FIG. 3, when a logical partition is started after the allocation of resources, the hypervisor, as represented at step 302, may create segment lookaside buffer entries and page table entries to map the 10 addresses allocated to a partition to within the partition's address space. The hypervisor then, at step 304, creates an ANDmask and ORmask. These masks are chosen in such a way that when applied on IO real address, will result in an effective address within the partition's address space. These ANDmask and ORmask can then, at step 306, be passed to partitions.

When a program running in a logical partition wants to access an IO device, it, as represented at step 310, performs the logical AND operation with the IO address and the above mentioned ANDmask. Then, at step 312, the program performs the logical OR operation with the result of the previous operation and the ORmask. The result will be an address within the partition's address space. It, as represented at step 314, can then perform the desired IO operation with the resultant address. The resultant address will be within the partition's address space.

For example:
Let us assume
IO device real address space: 0x3F2 0000 0000 thru 0x3FD 87FF FFFF
RMOR of the partition: 0x0004
RMLR of the partition: 256 GB Hypervisor may create segment lookaside buffer entries and page table entries to map effective addresses 0x0004 0032 0000 0000 through 0x0004 003D 87FF FFFF to real address 0x0000 03F2 0000 0000 through 0x0000 03FD 87FF FFFF
Effective address→Real address
0x0004 0032 0000 0000→0x0000 03F2 0000 0000
0x0004 003D 87FF FFFF→0x0000 03FD 87FF FFFF
The ANDmask in this case will be 0x0000 000F FFFF FFFF
and
the ORmask will be 0x0000 0030 0000 0000

When a partition wants to, say, read from the memory mapped IO address 0x3F200000000, it performs logical AND with 0xFFFFFFFFF. Then it performs logical OR with the result and 0x3000000000. The resultant address will be 0x3200000000.
0x0000 03F2 0000 0000 real address
0x0000 000F FFFF FFFF ANDMask
--------------------------------AND operation
0x0000 0002 0000 0000
0x0000 0030 0000 0000 ORMask
--------------------------------OR operation
0x0000 0032 0000 0000

Now the partition may perform the read operation at address 0x32 0000 0000. This effective address will then become 0x4 0032 0000 0000 because RMOR is 4. This effective address will then be translated by the PowerPC address translation mechanism into real address 0x3F2 0000 0000.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of enabling a program running on a logical partition, of a logically partitioned data processing system, to directly access a group of resources in the data processing system, the data processing system including a hypervisor to manage access to said group of resources, and wherein a given address space is allocated to the logical partition, and each of the group of resources has a first, real address outside said given address space, the method comprising the steps of:
    for each of the group of resources, the hypervisor mapping the first, real address of the resource to a second, effective address for the resource in said given address space;
    the hypervisor sending to the logical partitions procedures for transforming the real addresses of the resources of the group of resources to the effective addresses for said resources; and
    said program, using one of the procedures from the hypervisor, transforming the first, real address of one of said resources to the second effective address for said one of the resources; and using said second, effective address to access directly said one of the resources without using the hypervisor.

2. The method according to claim 1, wherein said transforming step includes a step of performing a series of logical operations using said first, real address to obtain said second, effective address.

3. The method according to claim 2, wherein said step of performing the series of logical operations includes a step of performing a logical AND operation using said first address and a given AND mask.

4. The method according to claim 3, wherein said step of performing the series of logical operations includes a further step of performing a logical OR operation using a given OR mask.

5. The method according to claim 4, including the further step of using the hypervisor to create the AND mask and the OR mask.

6. The method according to claim 4, wherein:
    the step of performing the logical AND operation includes using said first, real address and the given AND mask to obtain an intermediate address value; and
    the step of performing the logical OR operation includes using said intermediate address value and the given OR mask to obtain said second, effective address.

7. A logically partitioned data processing system that enables a program running in logical partition of the data processing system, to directly access a group of resources of the data processing system, wherein a given address space is allocated to the logical partition, and each of the group of resources has a first, real address outside said given address space, the system comprising:
    a hypervisor for managing access to said group of resources and for each of the group of resources, mapping the first, real address of the resource to a second, effective address for the resource in said given address space, and for sending to the logical partitions procedures for transforming the real addresses of the resources of the group of resources to the effective addresses for said resources;

said program, using one of the procedures from the hypervisor, transforming the first, real address of one of said resources, to the second effective address for said one of the resources; and said program using said second, effective address to access directly said one of the resources without using the hypervisor.

8. The system according to claim 7, wherein the transforming includes said program performing a series of logical operations using said first, real address to obtain said second, effective address.

9. The system according to claim 8, wherein said performing said series of logical operations includes:
   an AND mask;
   an OR mask; and
   processing said first address, using said AND mask and said OR mask, to obtain said second address.

10. The system according to claim 9, wherein said processing said first, real address includes:
    performing a logical AND operation using said first, real address and said given AND mask to obtain an intermediate address value; and
    performing a logical OR operation using said intermediate address value and said given OR mask to obtain said second, effective address.

11. The system according to claim 10, wherein said resource of said specific resource type is an input/output (I/O) resource.

12. A method of deploying a first computer program product for enabling a second computer program running on a logical partition, of a logically partitioned data processing system, to directly access resources of the data processing system, wherein the data processing system includes a set of resources and a hypervisor for managing access to said set of resources, and wherein a given address space is allocated to the logical partition, and each of the resources has a first, real address outside said given address space, and wherein for each of the group of resources, the hypervisor maps the first, real address of the resource to a second, effective address for the resource in said given address space, and wherein, when executed, the first computer program performs steps of:
    the hypervisor sending to the logical partitions procedures for transforming the real addresses of the resources of the group of resources to the effective addresses for said resources; and
    said program, using one of the procedures from the hypervisor, transforming the first, real address of one of said resources to the second, effective address for said one of the resources; and
    using said second, effective address to access directly said one of the resources without using the hypervisor.

13. The method according to claim 12, wherein the step of processing said first, real address includes using an AND mask and an OR mask to obtain said second, effective address.

14. The method according to claim 13, wherein the step of processing said first, real address using said AND mask and said OR mask includes steps of:
    performing a logical AND operation using said first, real address and said AND mask to obtain an intermediate address value; and
    performing a logical OR operation using said intermediate address value and said OR mask to obtain said second, effective address.

15. A method of providing access to IO resources within a data processing system partitioned into a set of logical partitions, each of said logical partitions having a respective address space and a respective set of IO resources, and wherein each of the resources has a first, real address, and said data processing system includes a hypervisor for managing access to the IO resources of the data processing system, and for each of the groups of resources mapping the first, real address of the resource to a second, effective address for the resource in said given, the method comprising the steps of:
    the hypervisor sending to the logical partitions procedures for transforming the real addresses of the resources of the group of resources to the effective addresses for said resources; and
    running a program on a first of said logical partitions, said program using one of the procedures from the hypervisor, transforming said first, real address of one of said resources to the second, effective address for said one of the resources;
    using said second, effective access directly said one of the resources without using the hypervisor.

16. The method according to claim 15, wherein the transforming step includes steps of:
    performing a logical AND operation using said first, real address and an AND mask to obtain an intermediate address value; and
    performing a logical OR operation using said intermediate address value and an OR mask to obtain said second, effective address.

17. The method according to claim 16, comprising a further step of using the hypervisor to create said AND mask and said OR mask.

* * * * *